United States Patent [19]

Marshall

[11] Patent Number: 4,605,923
[45] Date of Patent: Aug. 12, 1986

[54] METHOD AND APPARATUS FOR DETECTION OF ORGANIC FLUIDS

[75] Inventor: Allen T. Marshall, Little Rock, Ark.

[73] Assignee: Ensco, Inc., Little Rock, Ark.

[21] Appl. No.: 667,558

[22] Filed: Nov. 2, 1984

[51] Int. Cl.⁴ .................... G08B 21/00; G01N 3/18
[52] U.S. Cl. .................. 340/604; 73/61.1 R; 73/827
[58] Field of Search ............... 73/61.1 R, 827; 340/604, 602; 156/60

[56] References Cited

U.S. PATENT DOCUMENTS 4,246,575  1/1981  Purtell et al. ............... 340/604 X
4,351,642  9/1982  Bonavent et al. ........... 73/61.1 R X

FOREIGN PATENT DOCUMENTS 2149412  5/1973  Fed. Rep. of Germany ... 73/61.1 R
50139    4/1980  Japan ........................... 73/827

Primary Examiner—Stewart J. Levy
Assistant Examiner—Joseph W. Roskos
Attorney, Agent, or Firm—Alan Ruderman

[57] ABSTRACT

A method and apparatus for detecting the presence of an organic fluid has a pair of strips of fabric-like material joined together at one end in overlapping fashion by a bond formed from an organic fluid imbibing material sorbed into the common ends of the strip. The imbibing material is a latex polymer such as tertiary-alkylstyrenes. When the organic fluid contacts the bonded joint the imbibing material softens. A tensile force may be applied across the bonded joint by a resilient member which may be connected to mechanism for actuating electrical circuitry to signal the disjoining of the strips when the joint is softened sufficiently by the presence of the organic fluid.

15 Claims, 3 Drawing Figures

METHOD AND APPARATUS FOR DETECTION OF ORGANIC FLUIDS

BACKGROUND OF THE INVENTION

This invention relates to the detection of the presence of organic fluids or oils, and more particularly to a method and apparatus for sensing the presence of organic liquids or oils whether in an aqueous solution or on the surface of an aqueous stream or solid body, the sensing being particularly useful for the determination of the presence of organic contaminants in or on liquid or solid substrates.

It is known, as disclosed in Haigh U.S. Pat. No. 3,520,806, that organic liquids can be separated from aqueous substrates by contacting the substrate and organic liquids with a particulate cross-linked organic liquid-insoluble, organic liquid swellable polymer with the organic liquids imbibed therein. Utilizing the imbibing polymer principle a number of useful products have evolved. For example, in Hall, et al U.S. Pat. Nos. 3,750,688 and 3,958,590 and in Haigh, et al U.S. Pat. No. 4,024,882 valves are proposed having a bed of swellable polymer particles or beads which imbibe organic liquid materials to swell and close flow communication therethrough of an aqueous stream contaminated with organic liquid material. In Haigh, et al U.S. Pat. No. 3,686,827 and in Hall, et al U.S. Pat. No. 4,172,031 the imbibing bead principle is utilized for separating organic vapors from air and organic liquids through an aqueous stream respectively. In Larson, et al U.S. Pat. No. 4,302,337 an organic liquid imbibing coating is applied to the surface of a foraminous body and swells to plug the interstitial spaces within the body when contacted by an organic fluid thereby to close the flow of an aqueous contaminated stream therethrough to permit removal of the organic liquid from the stream.

As aforesaid these disclosures are concerned with the removal of organic fluids from a contaminated stream or to the shutting of the flow of such a stream in a conduit system. They are thus directed to closed systems in which a bed of imbiber beads may be placed for separation of the contaminants. There are, however, circumstances where the detection of such contaminants is desirable but where the fluid does not flow in a defined conduit system. For example, in situations where a contaminated fluid is spilled on the surface of water or on a solid surface such as on dry ground, pavement or floors. The aforesaid patents are not directed to such conditions.

Several sensing devices are known which can detect the presence of organic fluids such as solvents, hydrocarbons, halogenated solvents, aromatics, organic fuels, lubricating oils and the like. Some such devices employ the use of detectors which sense changes in thermal conductivity, density or viscosity. These physical characteristics are used to detect the presence of organic fluids as opposed to the presence of water or aqueous solutions. The known detectors are sophisticated electronic devices for providing warning signals to personnel that a spill may have occurred from a tank or other storage basin. The disadvantage of most of these devices is that they are very expensive, and may depend on apparatus which can be rendered inoperative by a hostile environment and, since the equipment is sensitive, inaccurate readings are possible.

Consequently, it is a primary object of the present invention to provide a method and apparatus for accurately detecting the presence of organic fluids on various substrates.

It is another object of the present invention to provide a method and apparatus for detecting the presence of organic fluids in or on the surface of an aqueous stream or a solid surface.

It is a further object of the present invention to provide a method and apparatus for detecting the presence of organic fluids in or on the surface of an aqueous or solid substrate and for providing a signal warning of such detection.

It is a still further object of the present invention to provide a sensing strip formed from a pair of strips coated with an imbibing latex polymer and joined together at an overlapping joint which softens upon contact with an organic fluid and upon being placed in tension disjoins to signal the presence of the organic fluid.

Accordingly, an organic fluid detecting strip is formed from separate strips of an imbibing latex emulsion sorbing material which have cooperating ends coated with an imbibing latex polymer and joined together at their common coated ends. The other ends of the strips may have a tensile force applied thereto so that the strips disjoin at the joint upon softening of the imbibing polymer when contacted with an organic fluid. The ends of the strips to be joined are coated with the imbibing latex by immersing those ends in an imbibing latex emulsion such as disclosed in the aforesaid Larson et al U.S. Pat. No 4,302,337, the disclosure of which is incorporated herein by reference. Thereafter the strips are joined and allowed to dry and fuse together, or the strips may be dryed without joining and thereafter the imbiber latex is softened by an organic fluid and the strips are then joined and dried.

In the specific form of the invention the strips are constructed from a fabric-like material and loops may be formed at the ends remote from the joined imbibing latex ends. Tension applying means may be connected to the looped ends so that the strips separate when an organic fluid contacts the joined ends.

The term "organic fluid" as employed herein is defined in a manner similar to the term "oil" defined in the aforesaid U.S. Pat. No. 4,302,337. Thus, by "organic fluid" is meant organic liquids or oils which are generally immiscible with water or soluble to not more than two weight percent in water at 25° C. and atmospheric pressure. Such organic fluids include: petroleum oils such as kerosene, lubricating oil, gasoline, jet fuel, and fuel oil. Other organic fluids include: benzene, toluene, xylene, ethylbenzene, aliphatic hydrocarbons such as hexane, octane, dodecane, eicosane, position isomers thereof, cyclic hydrocarbons such as cyclohexane, ethylcyclohexane, ketones such as 2-octenone, 4-dodecenone, and chlorinated solvents such as 1,1,1-trichloroethane, o-dichlorobenzene and the like. This list is not all inclusive but is merely representative of those organic fluids detectable by the imbibing latex polymer. Moreover, the term "fluid" as used herein is used in its ordinary sense and includes liquids, gases and vapors.

The imbibing latex coated on the strip comprises a generally coherent mass of organic liquid imbibing particles swellable in an organic fluid from about 2 to 50 times their unswollen volume. The coating comprises an imbibing latex polymer which has the property of being substantially insoluble in, but capable of being swollen by, that is, imbibing, one or more nonaqueous organic liquids.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
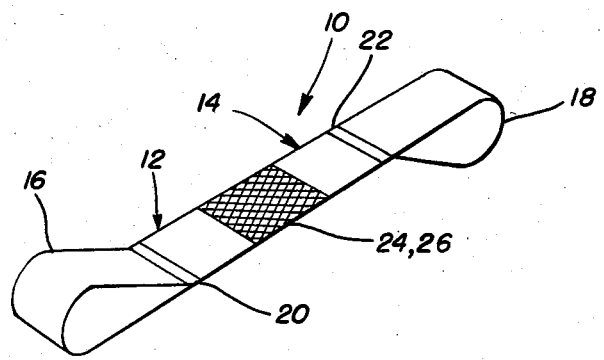
FIG. 1 is a diagrammatic depiction of a sensing strip constructed in accordance with the principles of the present invention.
Figure 2:
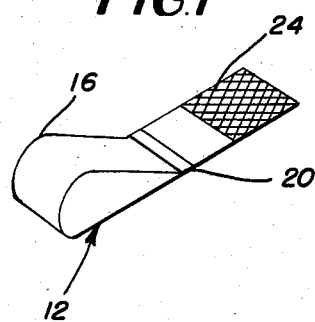
FIG. 2 is a diagrammatic depiction of a half strip utilized in constructing the completed sensing strip of FIG. 1; and „

Referring to the drawings a detecting strip 10 is constructed from a pair of half strips 12, 14 comprising a fabric-like textile material which will sorb the imbiber latex emulsion described in U.S. Pat. No. 4,302,337 and which will also wick and allow penetration by the organic fluid to be detected. Materials having these qualities include the natural materials used for producing fabrics such as cotton and wool, and the synthetic materials including polyolefin materials such as polypropylene, nylon, dacron, etc. and polyethylene, cellulose, wood fibre and substantially any other material having the aforesaid properties.

Latex polymers useful in the practice of the present invention are latexes of any polymers which swell on contact with organic fluids. Useful latex polymers may swell on contact with water, but additional swelling must occur when contacted with the organic fluid to be detected. Selection of a polymer for use with any organic fluid is readily accomplished by determining a swelling index for the latex polymer particles in the particular fluid to be imbibed, such swelling index being readily determined by the method disclosed in the aforesaid U. S. Pat. Nos. 4,302,337 and 3,750,688. Although any of the polymers described in these patents may be utilized in the practice of the present invention, as pointed out in each of those patents, advantageous materials which respond to a wide variety of organic fluids are polymers of styrene such as polystyrene and polymers of styrene and divinylbenzene containing up to about 10 percent by weight of divinylbenzene. For general use with aliphatic and aromatic hydrocarbons, alkylstyrene polymers and copolymers are of particular benefit, such polymers swelling very rapidly on contact with those organic fluids. These polymers and copolymers usually show substantial swelling when in contact with so called Number 2 diesel oil.

Preferably, crosslinked polymers and copolymers of styrenes, and of tertiary-alkylstyrenes, may be utilized as the imbibing latex polymer, such as those alkylstyrenes which have alkyl groups containing from 4 to 20, and preferably from 4 to 12, carbon atoms, such as: tertiary-alkystyrenes including, for example, p-tert-butylstyrene, p-tert-amylstyrene, p-tert-hexylstyrene, p-tert-octylstyrene, etc.; n-alkylstyrenes including, for example, n-butylstyrene, n-amylstyrene, n-hexylstyrene, n-octylstyrene, etc.; sec-alkylstyrenes, including, for example, sec-butylstyrene, sec-hexylstyrene, sec-octylstyrene, etc.; isoalkylstyrenes including, for example, isobutylstyrene, isoamylstyrene, isohexylstyrene, isooctylstyrene, etc.; and copolymers thereof.

Suitable monomers may be employed as comonomers with the alkylstyrene as described in the aforesaid U.S. Pat. No. 4,302,337. Similarly the crosslinking agents disclosed in the U.S. Pat. No. 4,302,337 patent may be utilized in preparing the imbibing latex polymers, but it does not appear that the amount or necessity of a crosslinking agent is critical to the present invention since dissolving of the imbibing polymer due to the lack of significant amount of crosslinking agent will merely result in disjoining of the half strips in the organic fluid in a short time. Thus, the crosslinking agents disclosed in U.S. Pat. No. 4,302,337 may be utilized to control the time in which the strips disjoin to signal the presence of the organic fluid.

The organic fluid imbibing latex utilized for coating the strip utilized in the prototype model hereinafter described comprised the polymerized mixture of tertiarybutylstyrene, 2-ethylhexyl acrylate and mixed methacrylate esters of cetyl to eicosyl alcohols described in the U.S. Pat. No. 4,302,337 patent.

Each half strip 12, 14 of the detector may be an elongated rectangular member having a first end bent over on itself so as to be formed into a respective loop 16, 18 and the end of the strip is stitched or bonded such as by heat staking or fusing as illustrated at 20, 22 to the remainder of the strip. The half strip at each end remote from the loop is thereafter immersed in the imbiber latex emulsion so as to be coated thereby as indicated at 24, 26. Each half strip so coated is brought into overlapping abutting engagement with another such half strip at their corresponding coated ends 24, 26 and the coated ends are joined by pressing together and thereafter permitting the latex to dry and effectively fuse the strips together, the fibers of the strips being substantially interlocked at the joint. Drying may occur at most any temperature, but it is preferred that such drying be above the glass temperature of the polymer. As an alternative, the detecting strip may be constructed by permitting the strips to dry without joining after coating with the imbiber latex and thereafter softening the latex with an organic fluid and then joining the strips together.

The imbibing coating as aforesaid, is an organic liquid swellable latex coating comprising a latex polymer, very fine particles of imbiber beads held in suspension and a small amount of an emulsfier. When the coating dries the particles cling together held by a small amount of the emulsion so as to form a film which absorbs and swells upon contact with an organic fluid and as it swells it forms a plurality of swollen latex particles which agglomerate into viscious blobs and the bond between the half strips softens and weakens. Thus, if the strip is placed under tension, the half strips separate when contacted by the organic fluid and provides a fail-safe operation in that when it fails it may provide a signal that the organic fluid is present. A spring or other means may be utilized in conjunction with the loops to provide the desired tension through the junction of the half strips.

Figure 3:
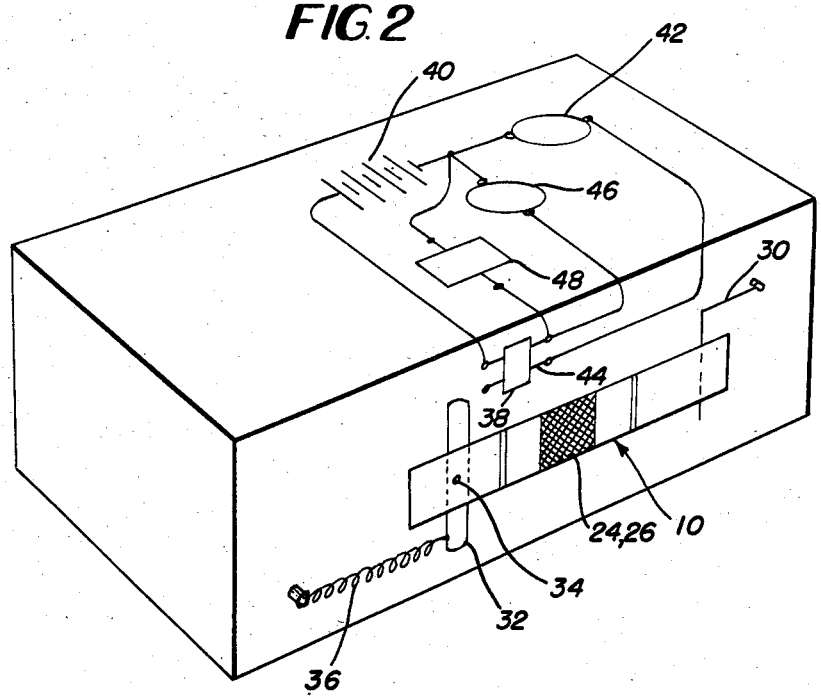
FIG. 3 is a diagrammatic depiction of a laboratory prototype demonstration model.

FIG. 3 illustrates diagrammatically a laboratory simulator model of a device incorporating apparatus for demonstrating the principles of the detector strip. The apparatus, which is mounted on a wooden block 28, includes the strip 10 joined at the coated ends 24, 26 of the overlapping half strips as aforesaid. A hook 30 is secured to the block at one end and has a leg extending through the loop, e.g. loop 18 at one end of the strip. Extending through the loop 16 at the other end of the strip is a lever 32 which is pivotably mounted intermediate its ends on a journal 34. One end, e.g. the bottom end, of the lever 32 may be connected to a tension spring 36 mounted on the block so as to pull on the strip and apply tension at the bonded connection 24, 26. A microswitch 38 is mounted on the block adjacent the normal position of the lever 32 and is disposed so as to be activated by the lever upon separation of the joined half strips. The switch 38 is connected in a circuit with a battery 40 or other source of electricity and the circuit may have a normally lit safety light 42, such as a blue light connected to a normally closed contact 44 of the switch, that contact opening when the switch is activated. The circuit may include an alarm light 46, such as a red light, and/or an audio alarm 48 such as a bell, siren, or other signal means which is activated when the lever engages and closes the switch.

In the laboratory simulator the block is placed in a metal pan to which water is added to the level of the strip. An organic fluid such as gasoline is then added to the water. As the strip absorbs the gasoline the coating swells and softens, and the bond between the half strips disjoins resulting in the lever 34 actuating the switch 38 to turn off the blue light 42 and turn the red alarm light 46 and/or actuate the audio alarm 48. This prototype device simulates an organic fluid spill on water and the detection device may actually be in a form such that it floats in the water. Spills on a solid substrate such as dry ground, pavement, floors or other surfaces, may be detected by placing the strip adjacent to or in contact with the surface.

By appropriate choice of the imbibing latex and of the spring tension, the time and pressure necessary for separation of the strips may be predetermined. The prototype model, for example, will actuate within a few seconds to a few minutes depending on the fluid spilled in the water. Detection of trace amounts or soluble amounts of an organic material may be detected, if desired, by appropriate selection of the various parameters.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. Apparatus for detecting of an organic fluid in or on a substrate, said apparatus comprising a pair of strips of fabric-material, one end of each strip being bonded to one end of the other strip at a joint by means of an organic fluid imbibing material sorbed therein, said imbibing material comprising a generally coherent mass of organic fluid imbibing latex polymer particles which swell and soften in the organic fluid, force applying means for placing said joint under tension so that said strips disjoin when said polymer has softened sufficiently, and sensing means for detecting the disjoining of said strips.

2. Apparatus as recited in claim 1, wherein said polymer comprises an alkylstryrene polymer.

3. Apparatus as recited in claim 2, wherein the alkylstryrene polymer comprises a polymer of an alkylstryrene which has alkyl groups containing from 4 to 20 carbon atoms.

4. Apparatus as recited in claim 2, wherein the alkylstryrene polymer is a polymer of t-butylstyrene.

5. Apparatus as recited in claim 1, wherein said force applying means comprises resilient means acting on an end of at least one of said strips remote from said joint.

6. Apparatus as recited in claim 1, wherein said sensing means comprises electrical circuit means for providing a signal upon disjoining of said strips.

7. Apparatus as recited in claim 6, wherein said polymer comprises an alkylstryrene polymer.

8. Apparatus as recited in claim 7, wherein the alkylstryrene polymer comprises a polymer of an alkylstryrene which has alkyl groups containing from 4 to 20 carbon atoms.

9. Apparatus as recited in claim 1, wherein each strip remote from said joint comprises a loop formed from said fabric-like material.

10. Apparatus as recited in claim 9, wherein said force applying means includes means disposed within each loop for pulling said strips.

11. Apparatus as recited in claim 10, wherein sensing means comprises electrical circuit means for providing a signal upon disjoining of said strips.

12. A method of detecting the presence of an organic fluid in or on a substrate, said method comprising disposing at the location where said fluid is to be detected a pair of strips of fabric-like material bonded together at a joint, said strips being bonded at said joint by an organic fluid imbibing material coated onto each strip at the joint and dried, said imbibing material comprising an organic fluid imbibing latex polymer which swells and softens in the organic fluid, applying a force to said joint tending to separate said strips, and sensing when the strips disjoin.

13. a method of forming a detector for detecting the presence of an organic fluid, said method comprising dipping one end of a pair of strips of fabric-like material into an organic fluid imbibing polymer latex emulsion, said material being one which will sorb said emulsion, said emulsion comprising latex polymer particles which swell and soften in the organic fluid, pressing said latex dipped ends together, and drying said ends to form a bond between said strips.

14. In the method as recited in claim 13, wherein said strips are dried before joining, and are thereafter softened with the organic fluid and then joined and dried.

15. In the method as recited in claim 13, including forming loops on the strips remote from said ends.

* * * * *